Feb. 5, 1963  A. G. BODINE, JR  3,076,544
SONIC MATERIALS SEPARATION APPARATUS
Original Filed March 19, 1956  2 Sheets-Sheet 1
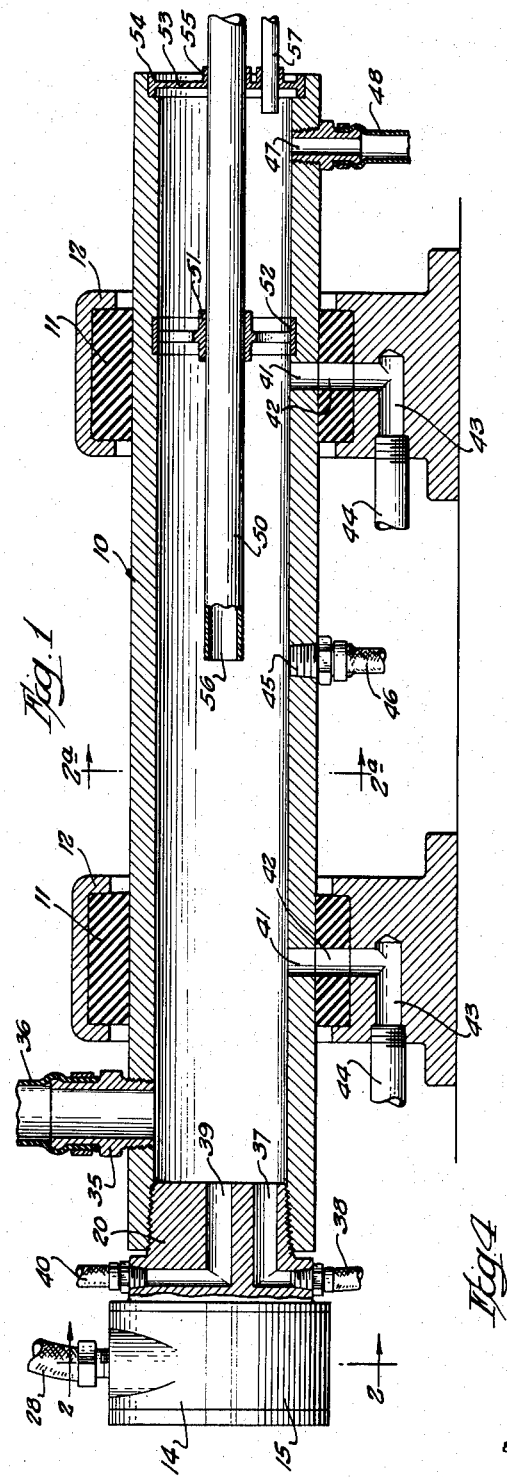
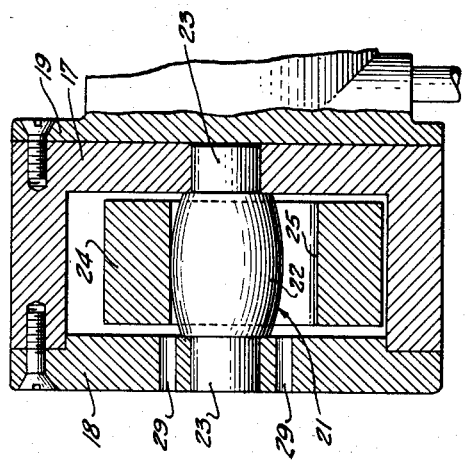
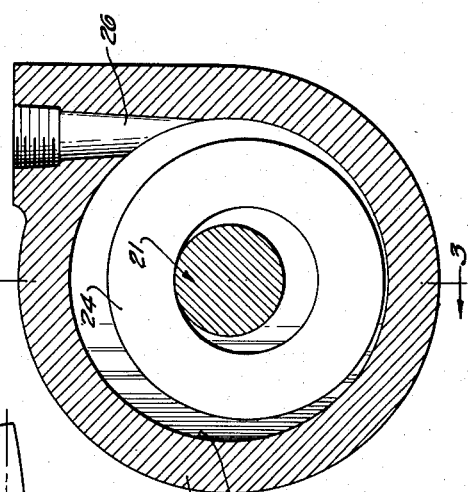
INVENTOR.
ALBERT G. BODINE, JR.
BY Lilly & Nyhagen
Attorneys

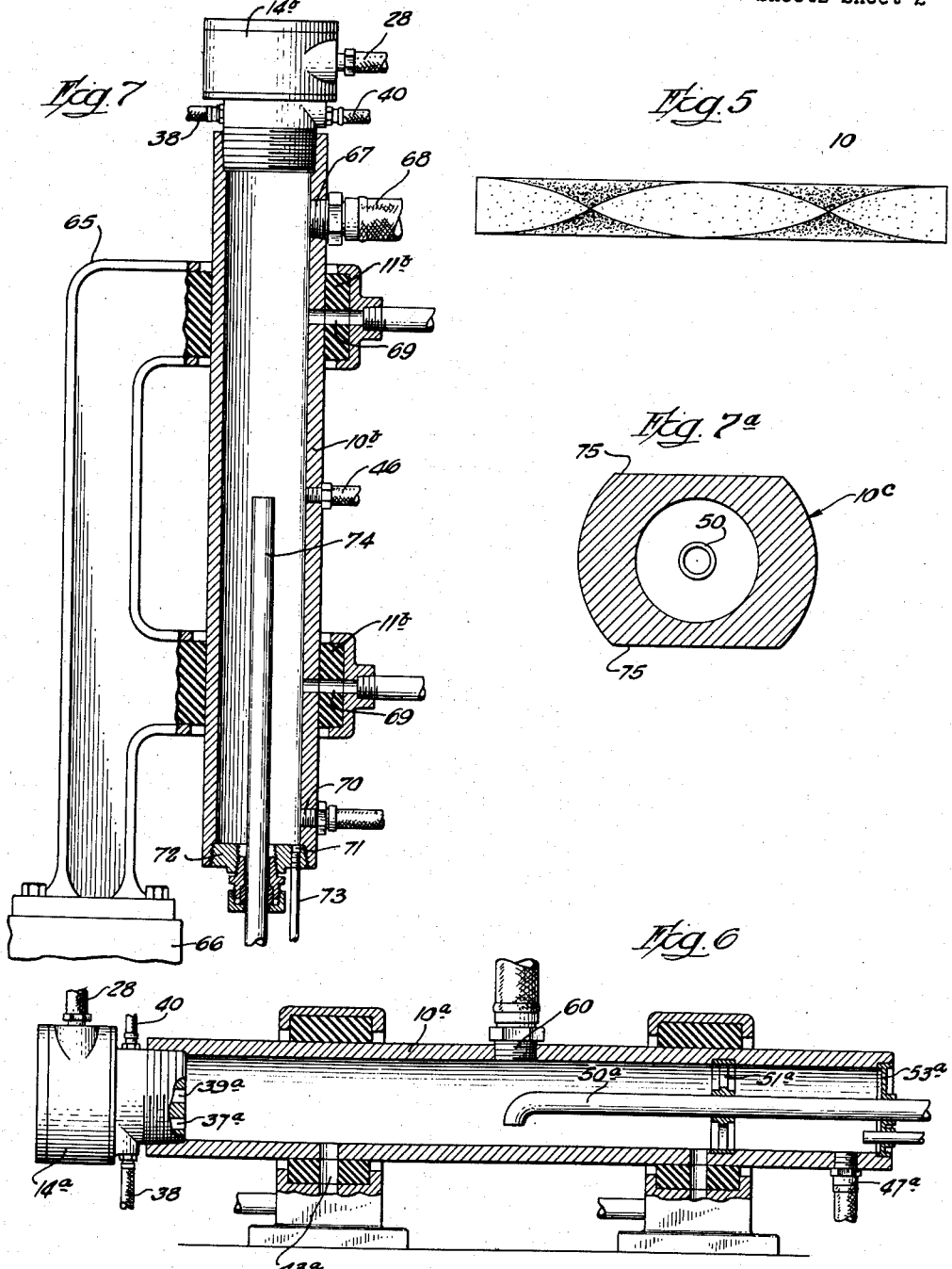

3,076,544
SONIC MATERIALS SEPARATION APPARATUS
Albert G. Bodine, Jr., Sherman Oaks, Calif.
(3300 Cahuenga Blvd., Los Angeles 28, Calif.)
Continuation of applications Ser. No. 843,269, Sept. 29, 1959, and Ser. No. 572,432, Mar. 19, 1956. This application Oct. 5, 1960, Ser. No. 60,685
4 Claims. (Cl. 209—1)

This invention relates generally to material moving and/or separating apparatus operating by sonic principles, and has application in a number of fields, including, among others: classification and separation of solid granular materials of different densities, or particle size, for example, separation of metals or metal salts from ore; and pumping of granular materials. This application is a continuation of my parent application, Serial No. 572,-432, filed March 19, 1956, entitled Sonic Materials Separation Process and Apparatus, and now abandoned, and also of my application, Serial No. 843,269, filed September 29, 1959, now abandoned, entitled Sonic Materials Separation Process and Apparatus.

A general object of the invention is to perform such functions and operations through use of propulsive forces generated in the granular materials in simple but powerful acoustic apparatus.

The granular materials in contemplation are normally dry. They may in some cases be moist; but fluid and liquid suspensions, particularly aerosols and hydrosols, are not within the sphere of the invention. The granular materials are also in a fluent form. When, for example, a mineral is to be separated from ore, the ore is preliminarily pulverized to a relatively small grain size, so that it flows freely. Without intention of limitation, it may be stated, for example, that good success has been attained in separating uranium salts from ore in one sonic apparatus in accordance with the invention with the ore ground to a maximum particle size of the order of $\frac{1}{16}''$. The material may of course be finer, and coarser material has also been successfully separated. The principal consideration in this connection is that the granular material be dry or semi-dry, or in other words comparatively or sufficiently dry such that it is freely fluent.

A typical process capable of being carried out by the invention comprises separation of such solid granular materials by placing a fluent body thereof in contiguous direct vibration-transmission contact with a vibrating sonic wave radiating surface vibrated by a powerful sound wave generator. The particles are maintained in continuous contact with each other and with such surface, and the latter is vibrated with a vibration pattern having a component of vibration normal to the area of contact between the surface and the body of material. The power capabilities of the sonic wave generator are sufficient, and its power output is adjusted sufficiently high, that the acceleration factor of the vibrations of the wave radiating surface attains a range wherein the body of fluent material becomes dynamically sustained in a flowing condition, like a liquid. Under such conditions, the constituents of different density or particle size are differentially motivated, with the effect that like particles of material agglomerate. The process finally includes the step of withdrawing a so differentiated constituent from the body of material.

According to one aspect of the invention, uniquely carried out in an illustrative embodiment of the invention, materials motivating forces are developed between the nodes and antinodes of an acoustic standing wave. These forces operate differentially, in certain apparatus according to the invention, on particles of different densities and/or particle size. Apparatus in accordance with the invention utilizes such forces to aid in separating or classifying heterogeneous mixtures of materials of different densities and/or particle size, for example, metals or metal salts from ores. The invention also employs, in different forms of apparatus, acoustic standing waves of different types, as will appear.

With this brief preliminary discussion in mind, the invention may best be further described in connection with the following detailed description of a number of typical forms and embodiments thereof, reference for this purpose being had to the accompanying drawings, in which:

FIG. 1 is a longitudinal sectional view of one form of apparatus in accordance with the invention;

FIG. 2 is a transverse section taken on line 2—2 of FIG. 1;

FIG. 3 is a section taken on line 3—3 of FIG. 2;

FIG. 4 is a diagrammatic view illustrating with exaggeration the type of standing wave action occurring in the apparatus;

FIG. 5 is a diagram showing a somewhat idealistic distribution of two materials of different densities as separated by the apparatus of FIGS. 1–4;

FIG. 6 is a view similar to FIG. 1 but showing a modification;

FIG. 7 is another view similar to FIG. 1 but showing another modification; and

FIG. 7a is a transverse section of a modified form of elastic gyratory tube.

There will be described first one illustrative species of the invention involving a novel sonic apparatus in which may be carried out my novel sonic process for separating granular materials of differing density or particle size. This species of the invention utilizes an elastic tube in which a gyratory type of acoustic standing wave is established.

Referring to FIGS. 1–4, numeral 10 designates generally an elastic tube, typically composed of steel or duraluminum, carried by spaced supports, here shown as rubber blocks on sleeves 11 supported by mountings 12, and these supports, while placed at nodes of the standing wave generated in the tube, are preferably such as will permit a substantial degree of elastic vibration in all directions in planes transverse of the tube. The tube does not rotate bodily, but portions thereof spaced from the nodal points of the standing wave set up in the tube gyrate in circular paths by elastic bending of portions of the tube from its neutral position (see the exaggerated diagram of FIG. 4). Such circular motion or gyration is a form of harmonic vibration, and may be analyzed as the resultant of two component linear transverse harmonic vibrations occurring at right angles to one another with 90° phase difference. The rubber blocks 11 will be seen to comprise compliant mountings permitting such gyratory action as may occur at the velocity nodes of the wave.

The vibration generator, generally designated by numeral 14, comprises a cylindric housing 15 formed with a cylindric chamber 16 preferably, though not necessarily, coaxial with the tube 10. This housing 15 is formed with one integral side closure wall 17, and its opposite side is fitted with a removable closure wall 18. A flanged fitting 19 is secured to the wall 17 and has a threaded projection 20 screwed into the corresponding end of tube 10. A center pin or axle 21 of circular cross section, preferably formed with a central crowned or barrel-shaped portion 22, has reduced end portions 23 set tightly into the walls 17 and 18. The crowned periphery of this axle 21 provides a rolling bearing surface, which is surrounded by a roller in the form of inertia ring 24, having a circular central opening 25 of substantially larger diameter than that of the portion 22 of pin 21, the outer periphery of the ring having a suitable clearance with the periphery of the cavity 16 when hanging on the axle 21, or spinning thereabout.

The inertia ring 24 is caused to roll or spin about the axle 21 by a fluid jet, either air under pressure, steam, or a liquid, introduced through an injection nozzle 26 formed in the housing 15 tangential to the periphery of the circular cavity 16, such fluid being introduced to the nozzle 26 via a hose 28 coupled thereto. The spent driving fluid may be discharged from the chamber 16 in any suitable manner, as by way of orifice 29 formed in closure plate 18 as close to the center of the chamber 16 as possible.

The tangentially introduced fluid causes the inertia ring 24 to roll or spin on the axle 21, and the centrifugal force exerted by the spinning ring on the axle, and thence transmitted to the housing 15 and from there to the end of the tube 10, elastically bends the end portion of the tube and moves it bodily about in a circular path. Each point on the tube describes a small circle in a plane transverse to the tube. As earlier mentioned, this gyratory motion of the end portion of the tube is a form of harmonic vibration, being the resultant of two perpendicular transverse linear harmonic vibration in quadrature.

FIG. 4 shows with some degree of exaggeration, the tube 10 undergoing gyratory elastic motion characteristic of a standing wave for fundamental resonant frequency of the tube for longitudinally propagated transverse elastic waves. It will be understood that the standing wave diagrammatically indicated in FIG. 4 results from the transmission longitudinally along the tube, from the generator 14, of elastic deformation waves, whose components of vibration are in transverse planes. These waves are reflected from the far end of the tube, and through interference with a succeeding forwardly propagated wave, the standing wave is established as indicated. Nodal points occur at sections of the tube approximately one quarter of its length from each of its ends, while the two ends of the tube and its center are at antinodes of the standing wave. In each transverse plane of the tube, the tube thus undergoes a gyratory motion, and the amplitude of this motion is minimized at the nodal points where the tube is supported by the rubber blocks 11, and is maximized at the antinodes.

The speed of rotation of the inertia ring 24 about the axle 21 depends at first upon the fluid jet which drives it. However, as the inertia ring is driven at a number of revolutions per second which approaches or approximates the resonant frequency of the tube for the described transverse mode of standing wave vibration, the inertia ring 24 then locks in or synchronizes at that frequency, and thereafter spins about its axle at a number of circuits per second equal to the resonant frequency for the tube 10 and housing 15.

I have discovered that such an elastic tube, undergoing such a gyratory standing wave, exhibits a remarkable propulsive force, in a direction longitudinally of the tube, on any substance or object in contact with either its inside or outside surface. This propulsive force is easily discoverable by simply pressing the finger down on the outside surface of the tube, the finger being forced strongly in the direction of a velocity node of the standing wave. The finger, touched against the inside surface of the right hand end portion of the tube, on the contrary, experiences a force moving it way from the node, i.e., toward the open end of the tube. A phenomenon not so readily explained is witnessed when the open right hand end of the tube 10 of FIG. 1 is closed tightly by means of a cork, the cork being found to move inward, towards the velocity node, contrary to the direction of force experienced by the finger. Such forces are useful for longitudinally moving granular materials in the tube, and for differentially moving heterogeneous mixtures through the tube for classification or separation purposes.

In addition to such longitudinally oriented propulsive forces, forces are exerted on the granular material in the tube in directions normal to the inside surfaces of the tube. A consideration of FIG. 4 will reveal that the vibration pattern illustrated therein is characterized by a component of vibration normal to the area of contact between the inside surface of the tube and the body of granular materials contacted thereby. The acoustic power of the apparatus is such that this normal component of vibration occurs with very high acceleration —many times that of the acceleration of gravity. At the acoustic power characteristic of the invention, a novel phenomenon is exhibited: the dry or comparatively dry granular material becomes dynamically sustained in a flowing condition like a liquid. In this vibratory, dynamically sustained and flowing condition, the particles of different density or grain size are differentially motivated, so that particles of like kind move together or agglomerate, whence differentiated constituents can be withdrawn from the body of material.

There is apparently involved also a phenomenon akin to cavitation in liquids. In connection with liquids, cavitation (which incidentally is undersirable in any liquid suspension separation system) represents a failure of a liquid to vibrate with or follow the full cycle of a vibratory surface. Thus, on the negative half-cycle of the vibration (away from the liquid), a liquid separation occurs. The resulting reduction in pressure leads to an asymmetric pressure wave in the liquid characterized by peaked positive half cycles. This follows from the low tensile strength of liquids, preventing the liquid from following fully the negative half-cycle movements of the vibratory surface. In similar manner, a body of solid granular materials has practically no tensile strength, and I have found that it therefore experiences an effect like cavitation to a surprisingly high degree when subjected to wave impulses from a sonic wave radiating surface vibrating normally thereto with an acceleration many times that of gravity. Thus they experience the positive or compressional half cycles only, and the wave impulses transmitted thereby are therefore substantially exclusively compressional waves. The wave form is asymmetric, with peaked positive half cycles, and almost completely eliminated negative half cycles. I have found that this form of wave transmission through the granular material results in a unidirectional propulsion of the materials. Assuming a mixture of two different granular materials, differing in density and/or particle size, the granules of each material are found to advance always in the same direction owing to the influence of the wave, but differentially according to the difference in density and/or particle size, resulting in their spacial differentiation and agglomeration. This, incidentally, is diametrically opposed to the effect of cavitation in liquid suspension systems, where cavitation aids mixing rather than separating.

To adapt the elastic tube and generator of FIGS. 1–4 to the purpose of separating materials of different qualities, for example, materials of different densities and/or particle size, such as metal or metal salts from ore, the tube may be equipped with various intake and discharge devices located at different positions along the tube, and at different locations radially of the tube. I have shown in FIG. 1 an inlet nipple 35 connected into tube 10 approximately midway between the tube support 11 and the generator 14, or in other words, approximately midway between a velocity node and a velocity antinode of the standing wave. This nipple receives granular material to be separated via a flexible hose 36.

An outlet passage 37 extends into the threaded generator projection or plug 20 and leads to a flexible materials discharge hose 38, the passage 37 communicating with the end portion of the space within the tube 10 near the bottom of the latter. Another materials discharge passageway 39 extends inwardly into plug 20 from a point approximately on the center axis of the tube 10, and leads upwardly to a flexible hose 40.

At each of the velocity nodal points of tube 10, the tube is formed with a downwardly extending discharge port 41, registering with a port 42 in block 11, and the latter leads to passageway 43 in mounting 12 and thence to discharge hose 44.

At the midpoint of the tube 10, on the bottom side thereof, there is formed a discharge port 45 leading to a flexible discharge hose 46. A similar discharge port 47 is formed in the bottom of tube 10 near the right hand end thereof and communicates with flexible discharge hose 48.

A small tube 50 extending axially within tube 10 is movable longitudinally therein through the hub 51 of a spider 52 seated in a suitable groove in tube 10, and a flexible end closure diaphragm 53 having a peripheral mounting ring 54 is seated in the end of the tube 10 to close the latter, being formed with a sealing flange 55 slidably fitting the tube 50 and therefore permitting longitudinal movement of said tube. The tube 50 is hence movable longitudinally to position its intake mouth 56 at any desired point along the central longitudinal axis of tube 10. A discharge tube 57 is also shown extending through diaphragm 53, between tube 50 and the bottom of tube 10.

The materials to be separated, preferably pulverized to more or less uniform particle size, are introduced through the inlet, so as to fill, or partially fill, the tube 10. Operation of the gyratory vibration generator 14 establishes the previously described acoustic standing wave in the tube, which vibrates with a component normal to its inside surface area, at an acceleration many times that of gravity. The granular particles are in contiguous direct vibration transmission contact with the inside surface of the tube, as well as being in contiguous contact with each other. The propulsive effect of the wall surface of the gyrating tube vibrating normally against the materials in contact therewith at high acceleration factor, including the above explained unidirectional travel and agglomerating compulsion owing to the described wave action on the materials, cause the materials to become dynamically sustained in a flowing condition and to differentially migrate to and agglomerate in spacially differentiated regions within the tube. Owing to the standing wave, the materials migrate differentially in longitudinal directions along the tube in vein-like convection flow streams, further agglomerate, and also, in many cases, depending upon relative densities and/or particle size, differentially settle or rise within the tube. One possible pattern of distribution of two materials of different densities and/or particle size in the tube 10, following operation of the device for a period of time, is represented in the diagram of FIG. 5, where the two differently shaded areas represent the differing and differentiated materials tending to collect in different regions of the tube. It will be seen that the invention contemplates location of outlets so as to receive separated or classified materials from regions of greatest concentration. The distribution represented in FIG. 5 is somewhat theoretical and idealistic, and assumes, for one thing, the special case of equal proportions of two component substances. In any practical case, those outlets will be used which are most advantageously located for withdrawal of separated or classified materials, according to the pattern of distribution discovered for the particular materials in hand, and for the relative proportions in which they occur. Thus the pattern of distribution can vary according to density, particle size, relative proportions of ingredients present, etc. Those outlet arrangements indicated in FIG. 1 are illustrative, but not limitative on the invention. Moreover, the location of the materials inlet is also subject to modification, and might be located where illustrated in FIG. 1, or at the antinodal point at the midpoint of the tube, as suggested in a presently described embodiment (FIG. 6). Moreover, the process may be carried on either continuously, or by batch operation.

FIG. 6 shows a generator 14a and tube 10a of the same type as shown in FIGS. 1–4, but equipped with alternative forms of intake and discharge openings. Thus, in this case, the inlet 60 is located at the midpoint of the tube 10a. A discharge tube 50a is provided, and is mounted for longitudinal sliding movement in spider 51a and in end closure 53a. This discharge tube 50a, however, has a right angle bend at its intake end, and the tube in this case may not only be moved longitudinally, but may be rotated as well, so as to collect material from any point along the length of tube 10a, as well as from different vertical levels thereof.

The embodiment of FIG. 6 is further equipped with certain discharge arrangements exactly like those of FIG. 1, such as discharge passageway 37a, discharge passageways 43a, and discharge 47a.

FIG. 7 shows an alternative embodiment in which the elastic tube, here represented at 10b, is oriented in a vertical position, its upper end carrying gyratory vibration generator 14b of the same material as the earlier described generator 14. The tube 10b is mounted at its nodal points in suitable supports, for example, rubber blocks 11b, which are in turn supported by a fixed frame 65 mounted on a bench 66, the blocks 11b being understood to engage tube 10b at velocity nodes of the standing wave set up in the tube by the generator 14b. An inlet nipple 67, to which is connected a flexible hose 68, feeds materials to be separated into the upper end portion of the tube. Various materials outlets are again provided, including passages 69 extending through the tube mountings at the velocity nodes, a lateral outlet 70 near the lower end of tube 10b, a port 71 through bottom end closure plug 72, and to which is connected flexible hose 73, and a vertical pipe 74 slidably mounted in plug 72, so as to reach to any adjusted height within the tube 10b.

Operation of the system of FIG. 7 is the same as that of FIGS. 1–4, excepting for such changes as are brought about by the force of gravity owing to the vertical orientation of the tube. In general, the action of gravity is to cause the more dense particles to travel downwardly, and the lighter particles to rise. These gravity influences are combined with the overall agitation and agglomerating action owing to the vibration of the tube, and with the longitudinal propulsive influences of the acoustic standing wave described hereinabove.

The elastic tubes 10, 10a and 10b of the foregoing embodiments are assumed to be of uniform circular section. However, by use of a modified section such as shown in FIG. 7a, where the tube 10c is shown to have flattened sides 75, the resonant frequency of the tube for transverse vibration about the axis parallel to the flat side 75 is substantially lowered, with the result that, as the vibration generator is brought up in speed, the system "locks in" at that frequency. Under these conditions, the vibration is predominantly, or almost entirely, in the plane perpendicular to the flat sides 75. The acoustic standing wave is developed in the same manner as before, but with transverse vibration principally in the one plane, rather than in the gyratory mode first described. This type of wave also furnishes material propulsive forces, and, although it is inherently of lower power capacity than is the gyratory type, it has the advantage that the tube is somewhat easier to mount mechanically.

The invention has now been shown in a number of illustrative forms. It will of course be understood that this is for illustrative purposes only, and that many variations in design, structure and arrangement are possible within the scope of the appended claims.

I claim:
1. In acoustic separator for unlike granular materials, the combination of: an elastic tube adapted to undergo gyratory standing wave action, and to have longitudinally spaced velocity nodal and antinodal regions, a gyratory wave generator coupled to said tube for producing said standing wave action, means for feeding materials to be separated into said tube and into contact with the interior surfaces thereof, and means for removing from said tube materials separated by said standing wave action and differentially collecting at different positions relative to said nodal and antinodal regions of said standing wave.

2. The subject matter of claim 1, including a material outlet near a velocity nodal region and another material outlet near a velocity antinodal region.

3. The subject matter of claim 1, wherein the axis of the tube is disposed at a substantial angle to horizontal.

4. The subject matter of claim 1, wherein the tube is substantially vertical.

References Cited in the file of this patent

UNITED STATES PATENTS

| | | |
|---|---|---|
| 1,983,968 | Clark | Dec. 11, 1934 |
| 2,071,260 | Holden | Feb. 16, 1937 |
| 2,591,083 | Maier | Apr. 1, 1952 |
| 2,755,927 | Brooks | July 24, 1956 |
| 2,766,881 | Westervelt | Oct. 16, 1956 |

FOREIGN PATENTS

| | | |
|---|---|---|
| 508,675 | Great Britain | June 26, 1939 |
| 718,588 | Great Britain | Nov. 17, 1954 |